(12) United States Patent
Toda et al.

(10) Patent No.: US 6,996,907 B2
(45) Date of Patent: Feb. 14, 2006

(54) AXIAL FORCE CONTROLLING METHOD AND BEARING APPARATUS

(75) Inventors: Kazutoshi Toda, Tondabaya (JP); Tomohiro Ishii, Kashiba (JP); Tadashi Mitarai, Kashiwara (JP); Daisaku Tomita, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/742,369

(22) Filed: Dec. 19, 2003

(65) Prior Publication Data

US 2004/0134071 A1  Jul. 15, 2004

Related U.S. Application Data

(62) Division of application No. 10/303,460, filed on Nov. 25, 2002, now abandoned, which is a division of application No. 09/562,390, filed on May 1, 2000, now abandoned.

(30) Foreign Application Priority Data

Jun. 21, 1999  (JP)  ............................... 11-173989

(51) Int. Cl.
*B21K 1/40* (2006.01)
*B21D 53/10* (2006.01)

(52) U.S. Cl. ........................... 29/898.062; 29/898.07; 29/894.361; 29/894.362

(58) Field of Classification Search ........... 29/898.062, 29/898.07, 894.361, 894.362, 509
See application file for complete search history.

(56) References Cited

U.S. PATENT DOCUMENTS 5,490,732 A * 2/1996 Hofmann et al. ........... 384/537
5,497,559 A * 3/1996 Okumura et al. ............ 33/517

* cited by examiner

*Primary Examiner*—Eric Compton
(74) *Attorney, Agent, or Firm*—Jordan and Hamburg LLP

(57) ABSTRACT

The present invention relates to an axial force controlling method for controlling an axial force applied to a rolling bearing in a bearing apparatus having a shaft body, the rolling bearing being mounted to the shaft body such that the rolling bearing fits an outside of the shaft body, and the bearing apparatus.

4 Claims, 4 Drawing Sheets

AXIAL FORCE CONTROLLING METHOD AND BEARING APPARATUS

REFERENCE TO RELATED APPLICATION

This is a divisional application of Ser. No. 10/303,460, now abandoned filed Nov. 25, 2002 which is in turn, is a divisional application of Ser. No. 09/562,390, now abandoned filed May 1, 2000. The subject matter of the aforementioned prior applications is hereby incorporated herein by reference.

BACKGROUND OF THE INVENTION

1. Field of the Invention

The present invention relates to an axial force controlling method for controlling an axial force applied to a rolling bearing in a bearing apparatus having a shaft body, the rolling bearing being mounted to the shaft body such that the rolling bearing fits an outside of the shaft body, and the bearing apparatus.

2. Description of the Related Art

An unpublished axial force controlling method of the present inventors will be described by reference to FIGS. 5 to 7.

A bearing apparatus shown in FIG. 5 is a hub unit for a driving wheel of a vehicle. The hub unit has a hub wheel 10 as a shaft body and an angular ball bearing 12 which is mounted to a shaft portion 11 of the hub wheel 10 such that the ball bearing 12 fits an outside of the shaft portion 11 and which is an example of a rolling bearing of an inclined contact type. A free end of the shaft portion 11 is caused to bulge and deformed outward in a diameter direction by rolling caulking to form a caulked portion 13. The bearing 12 has an inner ring 12a, an outer ring 12b, a plurality of balls 12c, and two snap cages 12d. In the bearing 12, necessary preload is applied to the inner ring 12a by the caulked portion 13 and the bearing 12 is prevented from dropping off from the hub wheel 10.

Such a hub unit is mounted between a drive shaft 14 and a shaft case 15 of the vehicle. In other words, the shaft portion 11 of the hub wheel 10 is spline-fitted with the drive shaft 14 and connected to the drive shaft 14 by a nut 16 and an outer ring 12b of the bearing 12 is connected to the shaft case 15 by a bolt 17.

In the shaft portion 11 of the hub wheel 10, a caulking jig 20 as shown in FIG. 7 is held against a cylindrical portion 11a to be caulked on a free end side of the shaft portion 111 as shown by a phantom line in FIG. 6 before caulking. Then, by rolling the caulking jig 20 about a one-dot dashed line O at a constant angle a, the cylindrical portion 11a to be caulked is caused to bulge and deformed radially outward, thereby forming the caulked portion 13 held against an outer end face of the inner ring 12a.

In the above bearing apparatus, because the caulked portion 13 is held against the outer end face of the inner ring 12a in order to bring the balls 12c into compressed states between the inner ring 12a and the outer ring 12b, a force for detaching the caulked portion 13 from the inner ring 12a in an axial direction acts on the caulked portion 13 on the contrary. As a result, an axially inward reaction force (hereafter defined as an axial force) for resisting the above force is generated from the caulked portion 13.

It is known that control for properly maintaining the axial force is necessary for ensuring a rolling property of the balls 12c.

In the prior-art axial force controlling method, the axial force is controlled by merely caulking the caulked portion 13 firmly, adjusting a thickness of the caulked portion 13, or adjusting applied pressure in caulking. However, it is not easy to properly control the axial force by this method.

The present inventors have studied the axial force earnestly and as a result, found the following point. There is a caulking starting point on an inner periphery side of the cylindrical portion 11a to be caulked of the shaft portion 11 in caulking the cylindrical portion 11a on the outer end face of the inner ring 12a and outward in the radial direction by using the caulking jig 20.

When an end edge on the inner periphery side of a chamfered portion formed at an inner peripheral shoulder portion of the inner ring 12a was defined as a point A, the caulking starting point was defined as a point B, and a relationship between relative positions of both the points A and B was changed, it was found—that the axial force applied to the outer end face of the inner ring 12a from the caulked portion 13 varied.

SUMMARY OF THE INVENTION

Therefore, it is a main object of the present invention to provide an axial force controlling method for properly and easily control an axial force and a bearing apparatus according to the method.

Other objects, features, and advantages of the invention will become apparent from the following descriptions.

In an axial force controlling method of the present invention for controlling an axial force applied to a rolling bearing in a bearing apparatus having the rolling bearing and a shaft body, the rolling bearing being mounted to the shaft body such that the rolling bearing fits an outside of the shaft body, the rolling bearing being prevented from dropping off by holding a caulked portion against an outer end face of an inner ring of the rolling bearing, and the caulked portion being formed by bending a cylindrical portion to be caulked on a free end side of the shaft body outward in a diameter direction, the method comprises the following steps for controlling the axial force applied to the rolling bearing through the caulked portion: a first step of setting a position (first position) of an end edge on an inner periphery side of a chamfered portion formed at an inner peripheral shoulder portion of the inner ring; and a second step of setting a relationship between relative positions on an axial direction of the first position and a position (second position) of a caulking starting point on an inner periphery side of the cylindrical portion to be caulked, thereby controlling the axial force through the caulked portion.

It is preferable that the second step is a step of positioning the second position on an axially outside with respect to the first position.

It is preferable that the second step is a step of axially aligning the second position with respect to the first position.

It is preferable that the second step is a step of positioning the second position on an axially inside with respect to the first position.

It is further preferable that the method includes a third step of setting a radial thickness of the cylindrical portion to be caulked.

It is further preferable that the method includes a fourth step of setting a hardness of the cylindrical portion to be caulked.

A bearing apparatus of the present invention comprises a rolling bearing and a shaft body, the rolling bearing being mounted to the shaft body such that the rolling bearing fits an outside of the shaft body and the shaft body having a cylindrical portion to be caulked on a free end side of the shaft body, wherein the cylindrical portion to be caulked of the shaft body is bent outward in a diameter direction onto an outer end face of an inner ring to form a caulked portion in a state in which a relationship between relative positions in an axial direction of a caulking starting point on an inner periphery side of the cylindrical portion and an end edge on an inner periphery side of a chamfered portion formed at an inner peripheral shoulder portion of the inner ring of the rolling bearing, and an axial force is applied to the rolling bearing through the caulked portion.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

Figure 5:
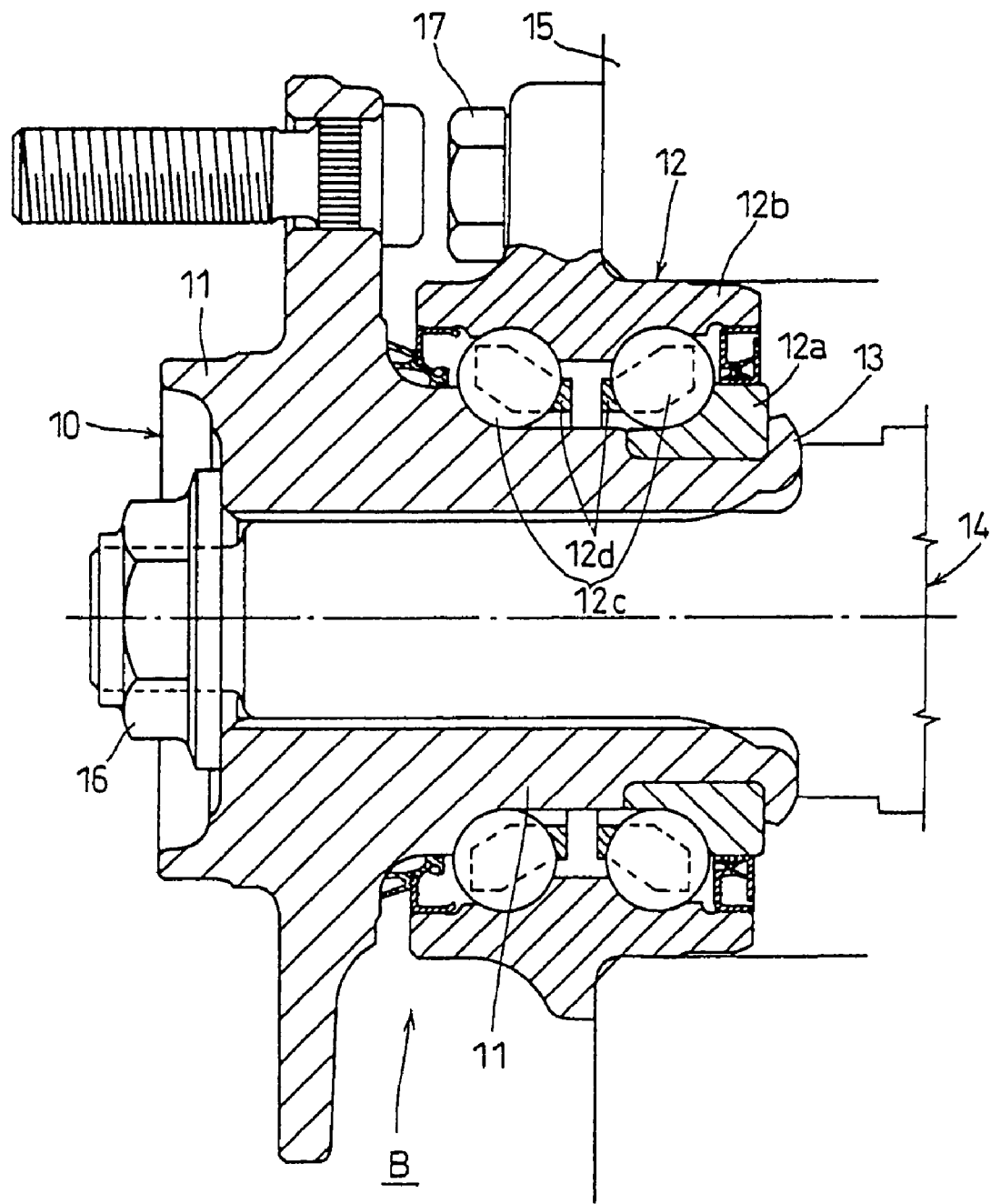
FIG. 5 is a vertical sectional side view of the hub unit for the vehicle driving wheel.
Figure 6:
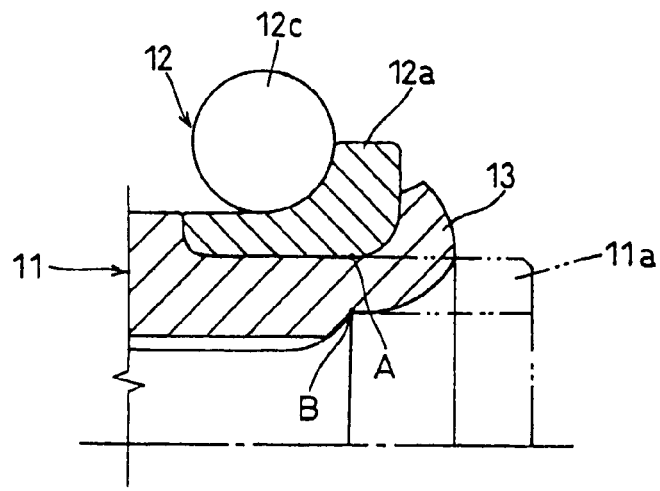
FIG. 6 is an enlarged view of a caulked portion that is an essential portion of FIG. 4.
Figure 7:
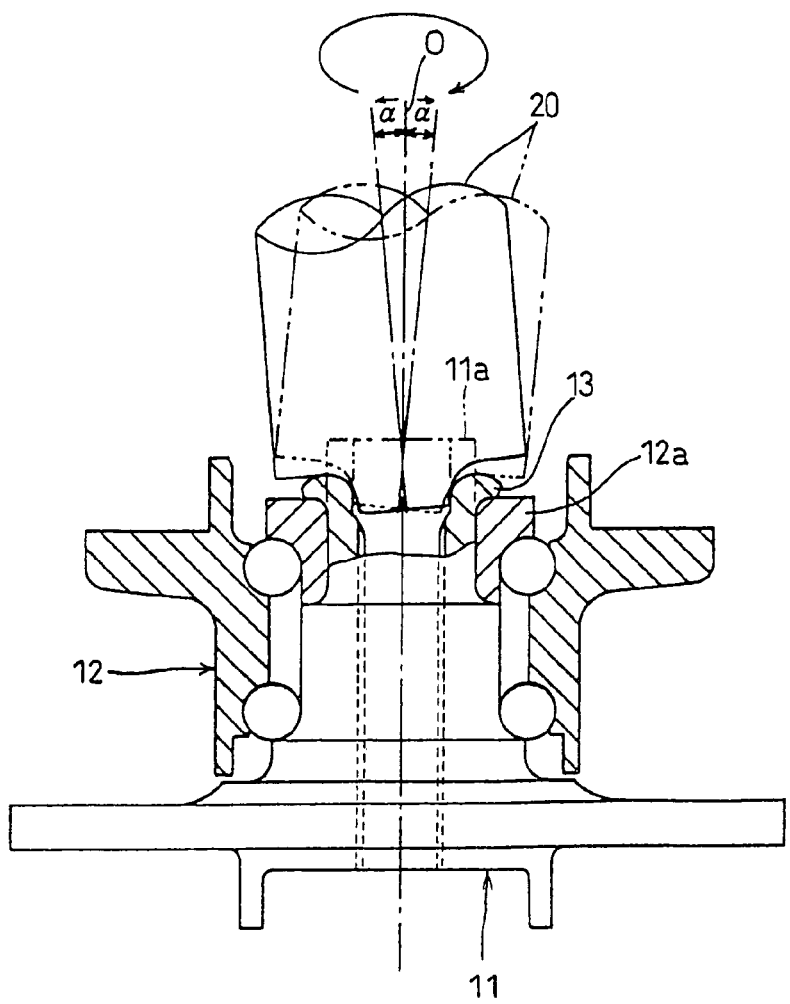
FIG. 7 is a step diagram for explaining a caulking form of the caulked portion of FIG. 4.

An axial force controlling method according to a preferred embodiment of the present invention and a bearing apparatus according to the method will be described below by reference to the drawings. In this embodiment, a hub unit for a vehicle driving wheel is taken as an example of the bearing apparatus. Because a basic structure of the hub unit is shown in FIG. 5, a detailed description of it will be omitted.

Figure 1:
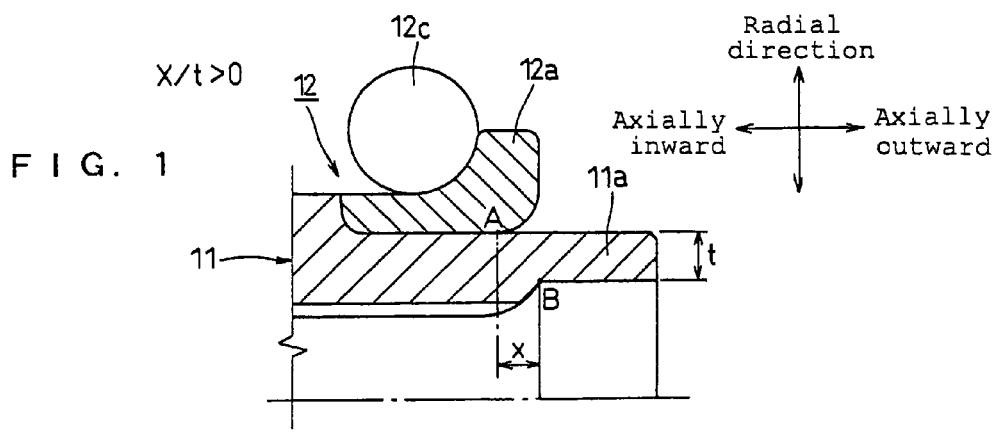
FIG. 1 shows a sectional view of an essential portion of a hub unit for a vehicle driving wheel controlled by an axial force controlling method of an embodiment of the present invention and shows a case in which a caulking starting point is positioned on an axially outside of an end edge position on an inner periphery side.
Figure 2:
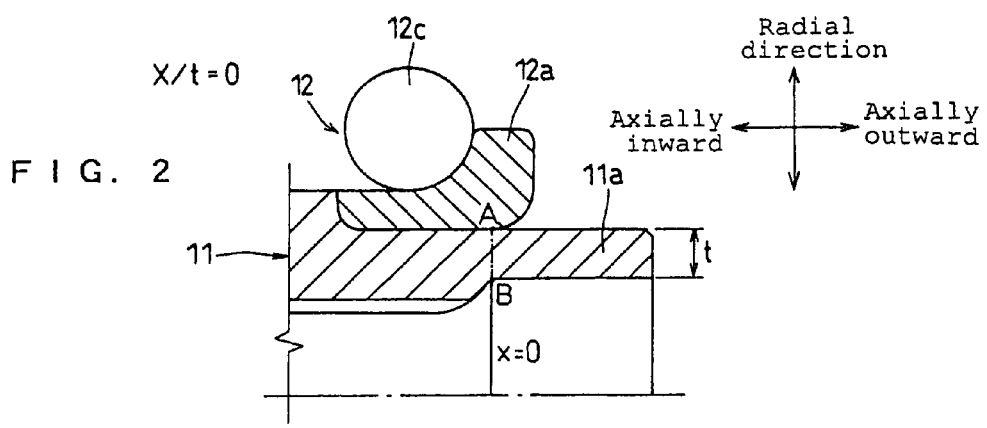
FIG. 2 corresponds to FIG. 1 and shows a case in which the caulking starting point is axially aligned with the end edge position on the inner periphery side.
Figure 3:
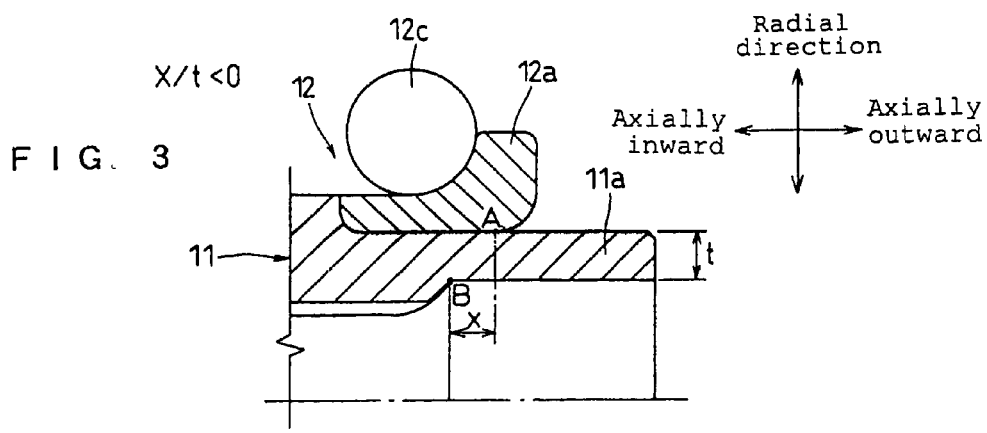
FIG. 3 corresponds to FIG. 1 and shows a case in which the caulking starting point is positioned on an axially inside of the end edge position on the inner periphery side.

By reference to FIGS. 1 to 3, the axial force controlling method of the preferred embodiment of the invention will be described. All of FIGS. 1 to 3 show a state before bending and caulking a cylindrical portion 11a to be caulked of a shaft portion 11 outward in a diameter direction onto an outer end face of an inner ring 12a. Illustration of a form after the caulking is omitted.

In these drawings, a character A designates a position on an axial direction of an end edge on an inner periphery side at a chamfered portion at an inner peripheral shoulder portion of the inner ring 12a of a rolling bearing 12 as a first position. In the following description, this position will be referred to as an origin point position A. A character B designates a position of a caulking starting point on an inner periphery side of the cylindrical portion 11a to be caulked as a second position.

The axial force controlling method of this embodiment includes a first step of setting the origin point position A and a second step of setting a relationship between relative positions in an axial direction of the origin point position A and the caulking starting position B as the steps for controlling an axial force applied to the rolling bearing 12 through the caulked portion 13.

With regard to the above relationship between the relative positions, the caulking starting point position B is positioned on an axially outside with respect to the origin point position A in FIG. 1, the caulking starting point position B and the origin point position A are aligned with each other in the axial direction in FIG. 2, and the caulking starting point position A is positioned on an axially inside with respect to the origin point position A in FIG. 3.

Here, the axial direction is plotted in a one-dimensional coordinate, e.g., x, the origin point position A is defined as an origin point of the one-dimensional coordinate x, and the caulking starting point position B is defined as a coordinate point x on the one-dimensional coordinate. As a result, the coordinate point x of the caulking starting point position B is greater than 0 in the case of FIG. 1, the coordinate point x of the caulking starting point position B is equal to 0 in the case of FIG. 2, and the coordinate point x of the caulking starting point position B is less than 0 in the case of FIG. 3.

Therefore, if a thickness of the cylindrical portion 11a to be caulked in a diameter direction is defined as t, x/t>0 in the case of FIG. 1, x/t=0 in the case of FIG. 2, and x/t<0 in the case of FIG. 3.

Figure 4:
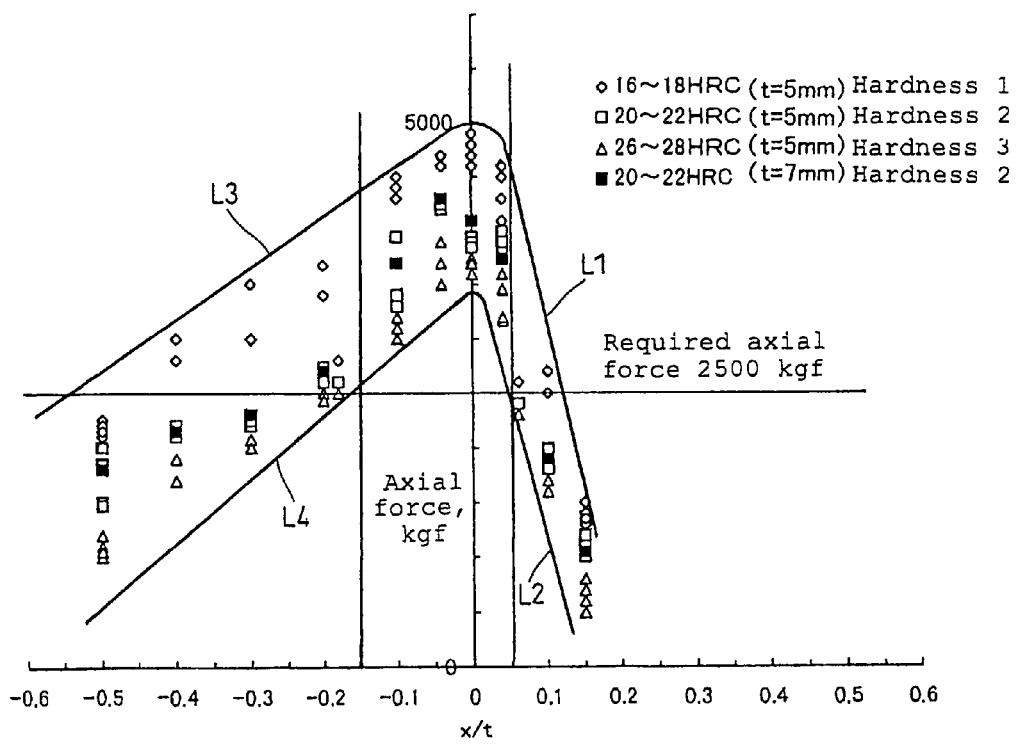
FIG. 4 shows a relationship between a position of the caulking starting position and an axial force.

The present inventors measured the axial force according to the settings of the relationship between the relative positions of the origin point position A and the caulking starting point position B in the respective cases of FIGS. 1 to 3 by experiment and obtained results as shown in FIG. 4. A horizontal axis designates x/t and a vertical axis designates the axial force (kgf) respectively in FIG. 4.

In this experiment, hardness of the cylindrical portion 11a to be caulked is varied among the case of FIG. 1, the case of FIG. 2, and the case of FIG. 3 to be low (16 to 18 HRC: hardness 1, represented by a mark ◇ in FIG. 4), middle (20 to 22 HRC: hardness 2, represented by marks □ and ■ in FIG. 4), and high (26 to 28 HRC: hardness 3, represented by a mark ∆ in FIG. 4).

With the hardnesses 1 and 3, the radial thickness t of the cylindrical portion 11a to be caulked is maintained at a constant value, i.e., 5 mm to carry out measurement.

With the hardness 2, two kinds of radial thicknesses t of the cylindrical portion 11a to be caulked, i.e., 5 mm (□ in FIG. 4) and 7 mm (■ in FIG. 4) are used to carry out the measurement.

The measurement will be described below by reference to FIG. 4.

(1) The Case of the Relationship Between the Relative Positions in FIG. 1 (x/t>0):

To improve accuracy and reliability of the measurement of the axial force, conditions of the measurement of the axial force are as follows. (1) The position of the caulking starting point B is varied four times toward the outside in the axial direction. (2) The hardness of the cylindrical portion 11a to be caulked is varied to be three kinds of hardnesses, i.e., the hardness 1, the hardness 2, and the hardness 3 at the respective positions of the caulking starting point B.

(3) With the hardness 2, the radial thickness t of the cylindrical portion 11a to be caulked is varied to be two kinds of thicknesses, i.e., 5 mm and 7 mm.

On the above conditions of the measurement, the axial force was measured at the respective caulking starting point positions B. These conditions of the measurement are similar in the following case.

The measurement results on the above conditions of the measurement are as shown in FIG. 4. In FIG. 4, variation of the axial force is between a measurement upper line L1 and a measurement lower line L2 and a downward slope toward the outside in the axial direction in an area between both the lines L1 and L2 is large.

According to the above results, with any hardnesses of the cylindrical portion 11a to be caulked, the axial force varies to be smaller as the caulking starting point position B moves toward the outside in the axial direction. Therefore, because the axial force varies depending on the setting of the relationship between the relative positions in the axial direction of the origin point position A and the caulking starting point position B, it is possible to properly and easily control the axial force applied to the rolling bearing 12 through the caulked portion 13.

Because the axial force varies also when the radial thickness—t of the cylindrical portion 11a to be caulked is varied to be 5 mm and 7 mm with the hardness 2, it is possible to further properly control the axial force by setting the radial thickness t of the cylindrical portion 11a as the third step.

Because the axial force varies also when the hardness of the cylindrical portion 11a to be caulked is varied to be the hardness 1, the hardness 2, and the hardness 3 with the same relationship between the relative positions, it is possible to further properly control the axial force by setting the hardness as the fourth step.

In this case of the hardness, the lower the hardness, the greater the axial force became. The reason for this is considered to be as follows. If the hardness of the cylindrical portion 11a to be caulked is smaller, the cylindrical portion 11a can be caulked easily and the inner ring 12a can be pushed axially inward to a greater extent. As a result, the larger axial force is obtained. Therefore, in order to increase the axial force, it is preferable that the hardness of the cylindrical portion 11a to be caulked is reduced.

Furthermore, the closer the caulking starting point position B to the origin point position A, the greater the axial force becomes.

(2) The Case of the Relationship Between the Relative Positions in FIG. 2 ($x/t=0$):

The conditions of the measurement in the case of this relationship between the relative positions are similar to those in the above (1) except that the caulking starting point position B is aligned with the origin point position A.

In this case also, it is possible to control the axial force by setting the relationship between the relative positions in the axial direction of the origin point position A and the caulking starting point position B.

Similarly to the above (1), it is possible to control the axial force by setting the radial thickness t of the cylindrical portion 11a to be caulked.

Similarly to the above (1), it is possible to control the axial force by setting the hardness. In other words, when a comparison was made between the hardness 1, the hardness 2, and the hardness 3 of the cylindrical portion 11a to be caulked, the greatest axial force was obtained with the hardness 1 and the axial force with the hardness 2 was substantially equal to that with the hardness 3 or slightly greater than that with the hardness 3 on average. The reason for this is considered to be the same as that in the above (1).

(3) The Case of the Relationship Between the Relative Positions in FIG. 3 ($x/t<0$):

The conditions of the measurement in the case of this relationship between the relative positions are similar to those in the above (1) except that the caulking starting point position B is on the axially inside.

In this case also, the axial force varies according to the setting of the relationship between the relative positions with any hardness. Therefore, it is possible to control the axial force by setting the relationship between the relative positions.

Similarly to the above (1), it is also possible to control the axial force by setting the radial thickness t of the cylindrical portion 11a to be caulked.

Furthermore, similarly to the above (1), it is also possible to control the axial force by setting the hardness.

In the variation of the axial force shown in FIG. 4, a downward slope toward the outside in the axial direction in the axial force area between the measurement upper line L1 and the measurement lower line L2 is large in the case of $x/t>0$ of the above (1) and a downward slope toward the inside in the axial direction in an axial force area between a measurement upper line L3 and a measurement lower line L4 is small in the case of $x/t<0$ of the above (3).

The reason for this is that deformed volume due to caulking of the cylindrical portion 11a to be caulked becomes large in the case of the above (1) and as a result, the axial force reduces if the applied pressure is constant.

If the minimum axial force (required axial force) required to ensure the rolling property of the balls 12c of the rolling bearing 12 is 2500 kgf, for example, x/t is in a range of $-0.15 \leq x/t \leq 0.05$ for the respective hardnesses, 1, 2, and 3 from the graph in FIG. 4. If the radial thickness t of the cylindrical portion 11a to be caulked is equal to 5 mm, for example, $-0.75 \leq x \leq 0.25$, in other words, a maximum permissible position to which the caulking starting point B of the cylindrical portion 11a to be caulked can move axially inward from the origin point position A is 0.75 mm in FIG. 3 and the maximum permissible position to which the caulking starting point position B of the cylindrical portion 11a to be caulked can move axially outward from the origin point position A is 0.25 mm in FIG. 1. Within this range, the required axial force of 2500 Kgf or more can be obtained.

As pieced together from the above measurement results, the closer the caulking starting point position B to the origin point position A, the greater the axial force becomes, but the caulking starting position B does not necessarily have to be aligned with the origin point position A if the above-described axial force required to ensure the rolling property of the balls 12c is considered and the caulking starting position B may be separated axially outward or axially inward from the origin point position A. In this case, there are both axially outward and inward maximum permissible separated distances, it is necessary to set the caulking starting point position B within a range of the maximum separated distances to control the axial force.

In order to obtain a necessary axial force with high accuracy, it is preferable to properly separate the caulking starting point position B axially outward or inward from the origin point position A.

Furthermore, because the radial thickness of the cylindrical portion 11a to be caulked is also related to the axial force, it is preferable to consider the radial thickness in addition to the axial position of the caulking starting point position B in controlling the axial force.

Moreover, because the hardness of the cylindrical portion 11a to be caulked is related to the axial force, it is preferable to consider the hardness in addition to the axial position of the caulking starting point position B in controlling the axial force.

In the above manner, according to the axial force controlling method of the present embodiment, it is possible to easily control the axial force such that the proper axial force can be obtained basically by setting the relationship between the relative positions.

The bearing apparatus to which the present invention is applied is not limited to the hub wheel shown in the above-described embodiment. The invention can be applied to control of the axial force in every bearing apparatus having a rolling bearing and a shaft body, the rolling bearing being mounted to—he shaft body such that the rolling bearing fits an outside of the shaft body, the rolling bearing being prevented from dropping off by holding the caulked portion against the outer end face of the inner ring of the rolling bearing, the caulked portion being formed by bending the cylindrical portion to be caulked on the free end side of the shaft body outward in the diameter direction.

Although the above hardness has a range of 2 HRC, this is variation caused by a heat treatment and this amount of variation is generated even in a treatment of the same lot.

The smaller the hardness, the larger the axial force becomes from the above measurement results only. However, a lower limit of the hardness is 16 HRC.

By the above axial force controlling method, the bearing apparatus according to the embodiment has the rolling bearing 12 and the shaft body 11, the rolling bearing 12 being mounted to the shaft body 11 such that the rolling bearing 12 fits the outside of the shaft body 11, and the shaft body 11 having the cylindrical portion 11a to be caulked on the free end side of the shaft body 11. The cylindrical portion 11a to be caulked of the shaft body 11 is bent outward in the diameter direction onto the outer end face of the inner ring 12a to form the caulked portion 13 in a state in which the relationship between the relative positions in the axial direction of the caulking starting point position B on the inner periphery side of the cylindrical portion 11a and the position A of the end edge on the inner periphery side of the chamfered portion formed at the inner peripheral shoulder portion of the inner ring of the rolling bearing is set. In this manner, in the case of this bearing apparatus, the axial force is applied to the rolling bearing 12 through the caulked portion 13 and it is possible to control the axial force applied to the rolling bearing 12 by setting the relationship between the relative positions.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An axial force controlling method for controlling an axial force applied to a rolling bearing in a bearing apparatus having said rolling bearing and a shaft body, said rolling bearing being mounted to said shaft body such that said rolling bearing fits an outside of said shaft body, said rolling bearing being prevented from dropping off by holding a caulked portion against an outer end face of an inner ring of said rolling bearing, and said caulked portion being formed by bending a cylindrical portion to be caulked on a free end side of said shaft body outward in a diameter direction, said method comprising the following steps for controlling said axial force applied to said rolling bearing through said caulked portion:

defining a first position as a position of an end edge on an inner periphery side of a chamfered portion formed at an inner peripheral shoulder portion of said inner ring;

defining a second position as a caulking starting point on an inner periphery side at a boundary of said cylindrical portion to be caulked and said shaft body;

determining axial forces resultant from said second position having axial displacements both axially inward and outward of said first position;

plotting said axial forces versus a displacement variable proportionate to said axial displacements and setting a minimum axial force to define an acceptable displacement range of said first position and said second position through which said minimal axial force is achieved; and performing caulking by bending the cylindrical portion beginning at said second position such that an axial displacement of said second position relative to said first position falls within said acceptable displacement range.

2. An axial force controlling method according to claim 1 wherein a coordinate point x of said second position is set the same as an origin of the first position in order to obtain maximum axial force.

3. An axial force controlling method according to claim 2, wherein a relationship of a radial thickness t of the cylindrical portion to be caulked is set at $-0.15 \leq x/t \leq 0.05$ while a required axial force of more than 2500 kgf is obtained.

4. An axial force controlling method according to claim 1, wherein said caulked portion of said shaft body is thinner than a remainder of the shaft body.

* * * * *